Aug. 2, 1949.   J. W. DAWSON   2,477,582
WELDING SYSTEM
Filed March 13, 1946
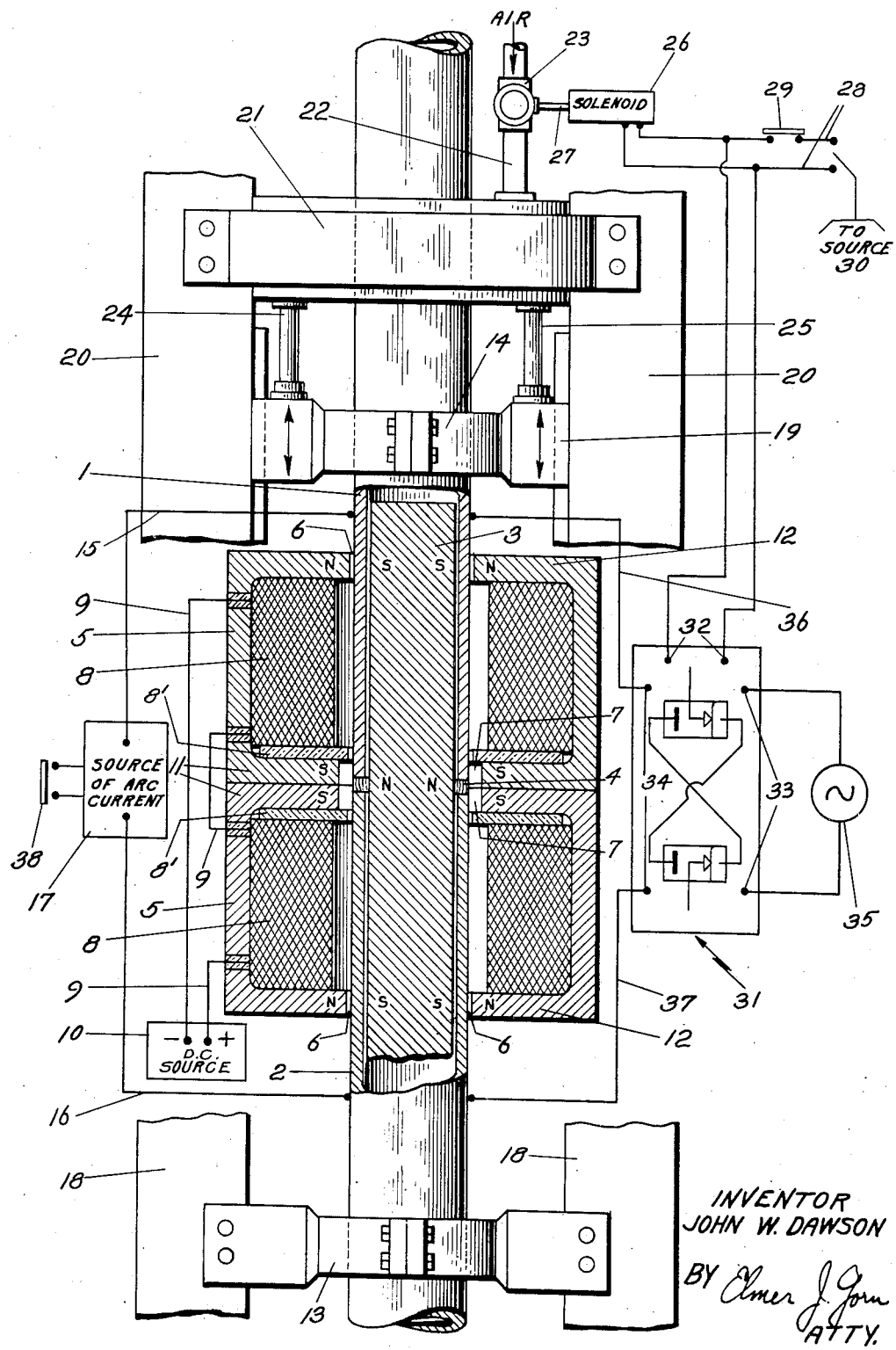
INVENTOR
JOHN W. DAWSON
BY Elmer J. Gorn
ATTY.

Patented Aug. 2, 1949

2,477,582

UNITED STATES PATENT OFFICE 2,477,582

WELDING SYSTEM

John W. Dawson, West Newton, Mass., assignor to Raytheon Manufacturing Company, Newton, Mass., a corporation of Delaware Application March 13, 1946, Serial No. 654,048

6 Claims. (Cl. 219—4)

This invention relates to a system and method for welding by means of electric current.

An object of this invention is to devise a machine and method for producing smooth uniform welds.

Another object is to heat the portion of a body to be welded to a very high temperature without producing any substantial flowing of the metal.

A further object is to concentrate the heat produced in a resistance-welding process in the portion of the body to be welded.

Another object is to provide a method for accomplishing preliminary heating of the portion of a body to be later welded by the resistance-welding method, whereby the welding itself may be performed more efficiently.

The foregoing and other objects of the invention will be best understood from the following description of an exemplification thereof, reference being had to the accompanying drawing wherein the figure is a cross-sectional view of an apparatus for carrying out the invention, together with a diagrammatic circuit of the system.

In the drawing, two metal bodies 1 and 2 which are shown in the form of tubes or pipes are to be welded to each other along their adjacent edges so as to form a continuous tube or pipe. The pipes are held spaced apart so as to provide an annular gap 4, in which an arc is to be established. A rod 3 of magnetic material is inserted inside the pipes 1 and 2 so as to extend past the gap 4 to a point substantially above said gap. Surrounding the pipes 1 and 2, respectively, is a pair of magnetic shells 5—5. Each of these shells is provided with aligned openings 6 and 7 through which the pipes may be inserted. In the outer annular space provided in each of the shells 5, an annular coil 8 is placed for the purpose of setting up a magnetic flux in each of the shells 5. If desired a refractory washer 8' may be placed at one end of each coil 8 so as to shield and protect said coil against the heat generated by the arc in the gap 4. The terminals of each coil 8 are provided with leads 9 passing through insulating bushings to the exterior of the shells 5. The leads 9 are arranged to connect the coils 8 in series with each other and with a source of magnetizing current, such as a direct current source 10.

The edges of the openings 7 in the shells 5 provide adjacent annular pole pieces 11—11. If desired the faces of the pole pieces 11 may likewise be protected from the heat of the arc by coating said faces with refractory material. The coils 8 are selected of such polarity as to make the adjacent pole pieces 11—11 of the same polarity. For example, the adjacent poles 11—11 may be made south poles. The edges of the openings 6 provide the opposite poles 12 which, in the example given above, will be north poles. Upon energizing the coils 8 as described, the rod 3 will have a localized south pole produced adjacent each of the annular poles 12, and a localized central north pole adjacent the annular pole pieces 11. Under these conditions a substantial amount of magnetic flux will pass radially throughout substantially the entire gap 4.

In order to hold the pipes 1 and 2 in the position as described, the lower pipe 2 may be securely held in a clamp 13 which is rigidly held in place by stationary base members 18—18. The upper pipe 1 may be held in a clamping member 14 supported by movable members 19—19, which are slidably mounted on stationary base members 20—20 so as to be movable in the directions indicated by the arrows thereon. The movable members 19—19 are actuated so as to move pipe 1 in the vertical direction by a means to be described hereinafter. The movable members 19 are adapted to hold the pipes 1 and 2 separated by a predetermined amount, and to move the lower end of the pipe 1 into intimate engagement with the upper end of the pipe 2.

The pipes 1 and 2 have electrically connected thereto conductors 15 and 16 which are connected respectively to the two terminals of a suitable source of arc current 17. The source 17 may supply current of any suitable nature, which may be in the form of direct current or alternating current, or any specialized current form particularly adapted for the purpose for which it is to be used.

In order to actuate the movable members 19—19, so as to move pipe 1 into engagement with pipe 2, a pneumatically-operated actuating means is provided. This means includes an annular cylinder 21 rigidly fixed to base members 20—20 and adapted to be supplied with compressed air from an air inlet pipe 22 through an inlet valve 23. Cylinder 21 contains an annular piston having two diametrically opposite rods 24 and 25 attached thereto. Rods 24 and 25 are attached, at their opposite ends, to movable members 19—19. It will therefore be apparent that, when compressed air is supplied to cylinder 21, rods 24 and 25 will be moved downwardly, thereby forcing movable members 19—19 and pipe 1 downwardly, also. Inlet valve 23 is adapted to be actuated by a solenoid 26 through a mechanical connection 27. Solenoid 26 is energized from any suitable source 30 through leads 28 and switch 29.

A timing unit 31 is provided, having control terminals 32, power input terminals 33, and power output terminals 34. This unit, as schematically indicated, is of the electronic type and is adapted, in response to a control voltage, to act as a switch whereby current is supplied from a source to a load for a predetermined time interval. Such timing units are well-known to those skilled in the art. Control terminals 32 of the unit 31 are connected to source 30 through switch 29. Power input terminals 33 are connected to a suitable alternating-current source 35. One of the power output terminals 34 is connected, by means of lead 36, to pipe 1, while the other output terminal 34 is connected, by lead 37, to pipe 2.

A switch 38 may be connected so as to control the arc current source 17. The switches 38 and 29 may be so interlocked that, a predetermined time interval after switch 38 is closed to energize source 17, switch 29 will also be closed. If desired, these switches may further be arranged so that when switch 29 closes, switch 38 will open.

Source 10 may be continuously energized. When switch 38 is closed to energize source 17, an arc is struck in the gap 4 in any suitable manner. For example, the arc may be struck by moving the pipe 1 into engagement with the pipe 2, and then separating the edges of said pipes in order to strike the arc. An "arc" in the sense as used in the specification and claims is an electrical space discharge which occurs between two separated surfaces, of sufficient intensity to produce substantial heating of the surface between which the discharge passes. The current of the arc flows longitudinally through the gap 4 while the magnetic field described passes radially through said gap. The reaction between this current and flux produces a force at right angles to the current and flux around the annular gap 4. This reaction, therefore, produces a dispersion of the arc throughout the gap 4. The magnetic field moves the arc at high speed around the gap so that the entire adjacent end portions of pipes 1 and 2 are heated to a high temperature.

The time elapsing between the closing of switches 38 and 29 is made such that the arc heats the end portions of pipes 1 and 2 to a high temperature, but one which is below the drip point of the metal of pipes 1 and 2, so that the metal of the pipes does not tend to drip or flow. It will be recalled that the arc current source 17 is energized when switch 38 is closed and is de-energized when switch 29 closes, so that the length of time the arc current is applied to the pipes will depend on the time elapsing between closing of switches 38 and 29 and may be made such that the above-described temperature of the end portions of pipes 1 and 2 is reached at the time the arc current is shut off. When switch 29 closes, solenoid 26 is energized from source 30 to open inlet valve 23, admitting air under pressure to cylinder 21. This causes the piston within said cylinder to be driven downwardly, thus forcing movable members 19—19 and pipe 1 downwardly also, until the adjacent ends of pipes 1 and 2, which have been raised to a high temperature by the heat of the arc, are pushed together. Since the control terminals 32 of unit 31 are connected to the source 30 through switch 29, when this switch closes a control voltage will be applied to unit 31. In response to this control voltage, unit 31 will cause alternating current to be supplied from source 35 to pipes 1 and 2 for a predetermined time interval (i. e., for a predetermined number of cycles of source 35).

While the alternating current of high value is being applied to pipes 1 and 2 from source 35 through unit 31, pipes 1 and 2 are in tight engagement with each other, so that the end surfaces thereof are heated to welding temperature by the current passing therethrough and the said surfaces are fused or welded together by this resistance-welding process. The adjacent end portions of pipes 1 and 2 having been previously heated by the arc to a high temperature, the resistance of these portions of the pipes will be greater than that of the remaining portions thereof, due to the positive temperature coefficient of resistance of the metal. Since the heat produced by the flow of an electrical current through a resistance is proportional to the product of the square of the current and the resistance through which it is flowing, the higher the resistance the greater will be the amount of heat produced. Therefore, since the resistance of the heated end portions of pipes 1 and 2 is substantially greater than that of the remaining portions thereof, so that in effect the total resistance of the pipes is concentrated in said heated end portions, the heat produced in the pipes as a result of the flow of alternating current from the source 35 therethrough will also be concentrated in the adjacent end portions (which are now in contact), these ends will be rapidly brought up to welding temperature, and the pipes will be welded together.

As stated above, substantially no flowing or drippage of the metal occurs during the period of arc heating of the pipes, while the two ends are separated. Therefore, when the softened ends of the two pipes are pushed together, there will be substantially no bulging or flowing outward of the metal, so that the external diameter at the juncture of the two pipes will be substantially the same as that of the pipes themselves. When the actual weld is produced later by the resistance-welding process, it will be smooth and uniform because substantially no flowing of the metal is produced by the latter process.

Of course, it is to be understood that this invention is not limited to the particular details as described above, as many equivalents will suggest themselves to those skilled in the art. For example, other means than that shown may be used to push the ends of the pipes together. Other types of sources than that schematically indicated at 31 may be used for heating the ends of the pipes to welding temperature after they have been pushed together. Other types of manually-operated controls, or even automatic controls, may be used to control the arc current source and the alternating-current heating source. Various other variations will suggest themselves. It is accordingly desired that the appended claims be given a broad interpretation commensurate with the scope of this invention within the art.

What is claimed is:

1. A system for welding together two members along surfaces thereof, comprising means for holding said members with the said surfaces separated, a source of arc current, means connecting said source to said members, means for so controlling said source as to cause an arc to strike between said surfaces and as to heat said surfaces to a high temperature below the drip point of said members, means for causing dispersion of said arc throughout said surfaces, means for bringing said surfaces into tight engagement, a source of alternating current, and means connecting said last-named source to said members to provide a current flow between said members to heat said surfaces to a welding temperature, said last-named means including means for so controlling said last-named source as to provide said current flow while said surfaces are in engagement.

2. A machine for welding together two members along surfaces thereof, comprising means for holding said members with the said surfaces separated, a source of arc current, means connecting said source to said members, means for so controlling said source as to cause an arc to strike between said surfaces and as to heat said surfaces to a high temperature below the drip point of said members, means for causing dispersion of said arc throughout said surfaces, power-operated means for forcing said surfaces into tight engagement, means for controlling said power-operated means, a source of alternating current, and means connecting said last-named source to said members to provide a current flow between said members to heat said surfaces to a welding temperature, said last-named means including means for so controlling said last-mentioned source as to provide said current flow while said surfaces are in engagement.

3. A system for welding together two members along surfaces thereof, comprising means for holding said members with the said surfaces separated, a source of arc current, means connecting said source to said members, means for so controlling said source as to cause an arc to strike between said surfaces and as to heat said surfaces to a high temperature below the drip point of said members, means for causing dispersion of said arc throughout said surfaces, means for bringing said surfaces into tight engagement, a source of alternating current, and timing means connecting said last-named source to said members to provide a current flow between said members for a predetermined time to heat said surfaces to a welding temperature, said last-named means including means for so controlling said last-named source as to provide said current flow while said surfaces are in engagement.

4. A system for welding together two members along surfaces thereof, comprising means for holding said members with the said surfaces separated, a source of arc current, means connecting said source to said members, means for so controlling said source as to cause an arc to strike between said surfaces and as to heat said surfaces to a high temperature below the drip point of said members, means for causing dispersion of said arc throughout said surfaces, means for bringing said surfaces into tight engagement, a separate source of heating current, and means connecting said last-named source to said members to provide a current flow between said members to heat said surfaces to a welding temperature, said last-named means including means for so controlling said last-named source as to provide said current flow while said surfaces are in engagement.

5. A machine for welding together two members along surfaces thereof, comprising means for holding said members with the said surfaces separated, a source of arc current, means connecting said source to said members, means for so controlling said source as to cause an arc to strike between said surfaces and as to heat said surfaces to a high temperature below the drip point of said members, means for causing dispersion of said arc throughout said surfaces, power-operated means for forcing said surfaces into tight engagement, means for controlling said power-operated means, a separate source of heating current, and means connecting said last-named source to said members to provide a current flow between said members to heat said surfaces to a welding temperature, said last-named means including means for so controlling said last-mentioned source as to provide said current flow while said surfaces are in engagement.

6. A system for welding together two members along surfaces thereof, comprising means for holding said members with the said surfaces separated, a source of arc current, means connecting said source to said members, means for so controlling said source as to cause an arc to strike between said surfaces and as to heat said surfaces to a high temperature below the drip point of said members, means for causing dispersion of said arc throughout said surfaces, means for bringing said surfaces into tight engagement, a separate source of heating current, and timing means connecting said last-named source to said members to provide a current flow between said members for a predetermined time to heat said surfaces to a welding temperature, said last-named means including means for so controlling said last-named source as to provide said current flow while said surfaces are in engagement.

JOHN W. DAWSON.

REFERENCES CITED

The following references are of record in the file of this patent:

UNITED STATES PATENTS

| Number | Name | Date |
| --- | --- | --- |
| 1,654,563 | Taylor | Jan. 3, 1928 |
| 1,780,297 | Heineman | Nov. 4, 1930 |
| 1,857,060 | McBerty | May 3, 1932 |
| 1,916,013 | Otto et al. | June 27, 1933 |
| 2,231,317 | Bernard | Feb. 11, 1941 |
| 2,286,211 | Dawson et al. | June 6, 1942 |